US009826523B2

United States Patent
Chen et al.

(10) Patent No.: US 9,826,523 B2
(45) Date of Patent: Nov. 21, 2017

(54) SEMI-PERSISTENT SCHEDULING FOR EIMTA IN LTE

(71) Applicant: QUALCOMM Incorporated, San Diego, CA (US)

(72) Inventors: Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 155 days.

(21) Appl. No.: 14/661,895

(22) Filed: Mar. 18, 2015

(65) Prior Publication Data

US 2015/0271798 A1 Sep. 24, 2015

Related U.S. Application Data

(60) Provisional application No. 61/968,797, filed on Mar. 21, 2014.

(51) Int. Cl.
*H04W 72/04* (2009.01)
*H04L 1/18* (2006.01)
*H04L 5/00* (2006.01)

(52) U.S. Cl.
CPC ......... *H04W 72/044* (2013.01); *H04L 1/1812* (2013.01); *H04L 1/1854* (2013.01);
(Continued)

(58) Field of Classification Search
CPC .. H04W 72/044; H04L 1/1812; H04L 1/1854; H04L 1/1887; H04L 5/0053
See application file for complete search history.

(56) References Cited

U.S. PATENT DOCUMENTS

2013/0242923 A1* 9/2013 Yang ............... H04L 1/1825
370/329
2015/0049682 A1* 2/2015 Seo ............... H04L 5/0055
370/329
(Continued)

FOREIGN PATENT DOCUMENTS

EP 2690815 A2 1/2014

OTHER PUBLICATIONS

Alcatel-Lucent Shanghai Bell, et al., "Discussion on HARQ timing with dynamic TDD UL-DL configuration", 3GPP Draft; R1-120513 Discussion on HARQ Timing With Dynamic TDD UL-DL Configuration Final, 3rd Generation Partnership Project (3GPP), Mobile Competence Centre, 650, Route Des Lucioles, F-06921 Sophia-Antipolis Cedex; France, vol. RAN WG1. no. Dresden, Germany; 20120206-20120210, Feb. 1, 2012 (Feb. 1, 2012), XP050563230, [retrieved on Feb. 1, 2012] the whole document.

(Continued)

*Primary Examiner* — Albert T Chou
(74) *Attorney, Agent, or Firm* — Nerrie M. Zohn

(57) ABSTRACT

The present disclosure relates generally to wireless communication, and more particularly, to methods and apparatus for semi-persistent scheduling for eIMTA in LTE. An exemplary method includes receiving signaling configuring the UE with a first subframe configuration; determining a reference subframe configuration for downlink hybrid automatic repeat request (HARQ) operation; receiving a control channel in a first subframe activating semi-persistent scheduling (SPS) for at least one of uplink or downlink SPS transmissions; determining whether or not to transmit the at least one uplink or downlink SPS in one or more second subframes based on at least one of the activating control channel, the first subframe configuration, or the reference subframe configuration; transmitting the at least one uplink or downlink (Continued)

SPS in the one or more second subframes based at least in part on the activating control channel.

28 Claims, 12 Drawing Sheets

(52) U.S. Cl.
CPC .......... *H04L 1/1887* (2013.01); *H04L 5/0053* (2013.01); *H04L 1/1864* (2013.01); *H04L 1/1896* (2013.01)

(56) References Cited

U.S. PATENT DOCUMENTS

| | | | | |
|---|---|---|---|---|
| 2015/0092624 A1* | 4/2015 | Yao | ..................... | H04L 5/0055 370/278 |
| 2015/0263829 A1* | 9/2015 | Nguyen | ............ | H04W 72/1289 370/280 |
| 2015/0264678 A1* | 9/2015 | Yin | ..................... | H04W 52/22 370/329 |

OTHER PUBLICATIONS

International Search Report and Written Opinion—PCT/US2015/021596—ISA/EPO—dated Jul. 3, 2015.

* cited by examiner

Uplink-downlink configurations.

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 7

| | 0 | 1 | 2 | 3 | 4 | 5 | 6 | 7 | 8 | 9 | 0 | 1 | 2 | 3 | 4 | 5 | 6 | 7 | 8 | 9 | ... | 0 | 1 | 2 | 3 | 4 | 5 | 6 | 7 | 8 | 9 |
|---|---|---|---|---|---|---|---|---|---|---|---|---|---|---|---|---|---|---|---|---|---|---|---|---|---|---|---|---|---|---|---|
| SIB1 (config #1) | D | S | U | U | D | D | S | U | U | D | D | S | U | U | D | D | S | U | U | D | ... | D | S | U | U | D | D | S | U | U | D |
| Ref DL HARQ config #5 | D | S | U | D | D | D | D | D | D | D | D | S | U | D | D | D | D | D | D | D | ... | D | S | U | D | D | D | D | D | D | D |
| eIMTA | D | S | U | U | D | D | S | U | U | D | D | S | U | D | D | D | D | D | D | D | ... | D | S | U | U | D | D | D | D | D | D |

Frame N     Frame N+X     Frame N+Y eIMTA based on Configuration #2 eIMTA based on Configuration #4

FIG. 9

| TDD UL/DL configuration | Number of HARQ processes for normal HARQ operation | Number of HARQ processes for subframe bundling operation |
|---|---|---|
| 0 | 7 | 3 |
| 1 | 4 | 2 |
| 2 | 2 | N/A |
| 3 | 3 | N/A |
| 4 | 2 | N/A |
| 5 | 1 | N/A |
| 6 | 6 | 3 |

FIG. 10A

| TDD UL/DL configuration | Position of initial Semi-Persistent grant | Subframe_Offset value (ms) |
|---|---|---|
| 0 | N/A | 0 |
| 1 | Subframes 2 and 7 | 1 |
| 1 | Subframes 3 and 8 | -1 |
| 2 | Subframe 2 | 5 |
| 2 | Subframe 7 | -5 |
| 3 | Subframes 2 and 3 | 1 |
| 4 | Subframe 4 | -2 |
| 4 | Subframe 2 | 1 |
| 4 | Subframe 3 | -1 |
| 5 | N/A | 0 |
| 6 | N/A | 0 |

SEMI-PERSISTENT SCHEDULING FOR EIMTA IN LTE

The present application for patent claims benefit of U.S. Provisional Patent Application Ser. No. 61/968,797, filed Mar. 21, 2014 and assigned to the assignee hereof and hereby expressly incorporated by reference herein.

BACKGROUND

Field

The present disclosure relates generally to wireless communication, and more particularly, to methods and apparatus for semi-persistent scheduling uplink and/or downlink transmissions.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE/LTE-Advanced is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Certain aspects of the present disclosure provide a method for wireless communications by a base station. The method may be performed by a user equipment (UE) and generally includes receiving signaling configuring the UE with a first subframe configuration, determining a reference subframe configuration for downlink hybrid automatic repeat request (HARQ) operation, receiving a control channel in a first subframe activating semi-persistent scheduling (SPS) for at least one of uplink or downlink SPS transmissions, and determining whether to transmit uplink SPS transmissions or receive downlink SPS transmissions in one or more second subframes based on at least one of the activating control channel, the first subframe configuration, or the reference subframe configuration.

Aspects generally include methods, apparatus, systems, computer program products, and processing systems, as substantially described herein with reference to and as illustrated by the accompanying drawings. "LTE" refers generally to LTE and LTE-Advanced (LTE-A).

BRIEF DESCRIPTION OF THE DRAWINGS

FIG. 7 illustrates a list of uplink/downlink subframe configurations in accordance with certain aspects of the present disclosure.

FIG. 9 is a diagram of frame configurations for an eNB 610 in communication with a UE 650 in an access network.

FIG. 10A illustrates an exemplary number of possible UL HARQ processes, in accordance with certain aspects of the present disclosure.

FIG. 10B illustrates exemplary TDD UL/DL configurations and their associated Subframe Offset values, in accordance with certain aspects of the present disclosure.

FIG. 11 is a diagram of possible frame configurations, in accordance with certain aspects of the present disclosure.

DETAILED DESCRIPTION

Figure 1:
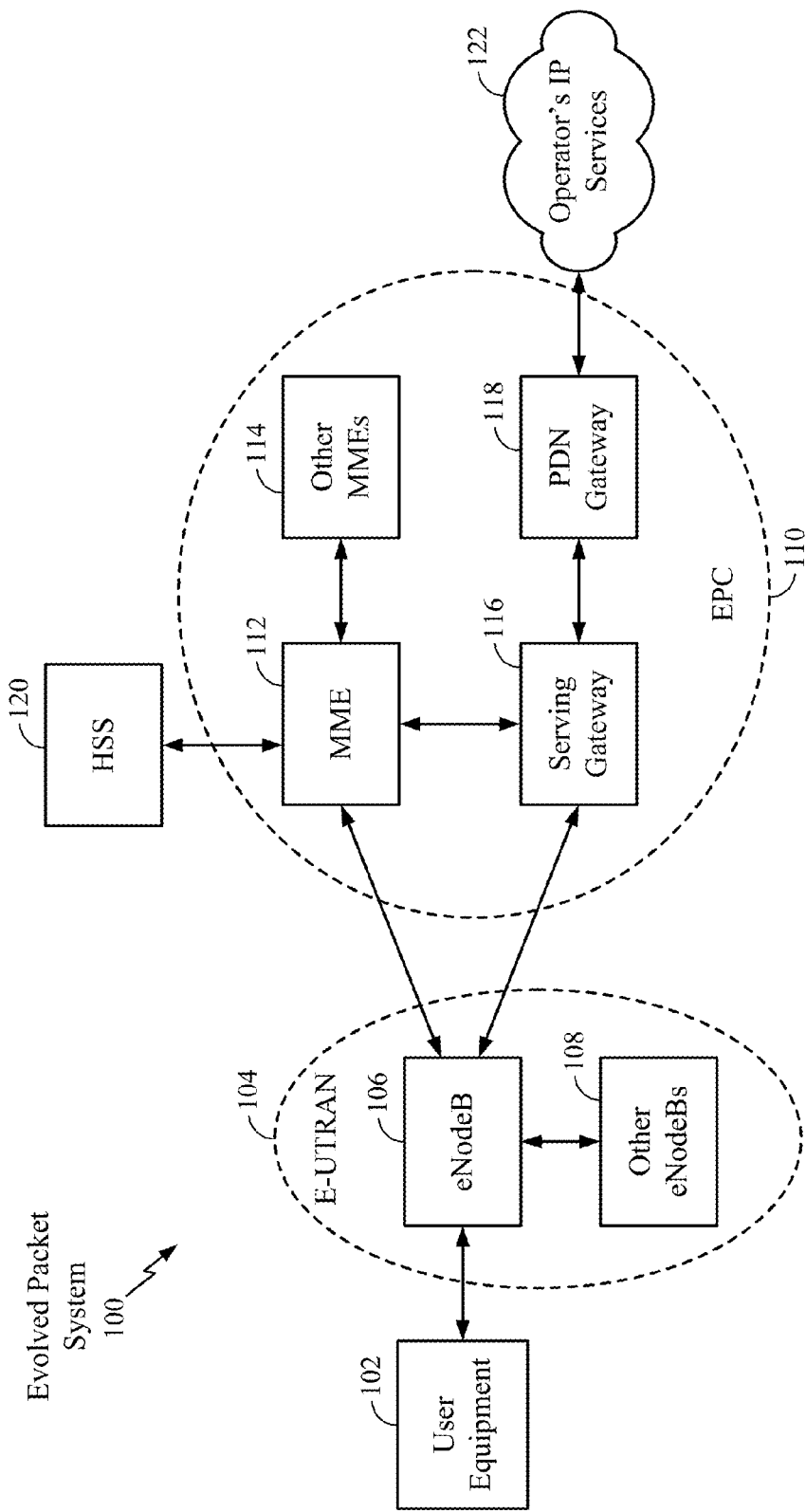
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software/firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS 100 can interconnect with other access networks, but for simplicity those entities/interfaces are not shown. Exemplary other access networks may include an IP Multimedia Subsystem (IMS) PDN, Internet PDN, Administrative PDN (e.g., Provisioning PDN), carrier-specific PDN, operator-specific PDN, and/or GPS PDN. As shown, the EPS 100 provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), an access point, or some other suitable terminology. The eNB 106 may provide an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a netbook, a smart book, an ultrabook, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include, for example, the Internet, the Intranet, an IP Multimedia Subsystem (IMS), and a PS (packet-switched) Streaming Service (PSS). In this manner, the UE102 may be coupled to the PDN through the LTE network.

Figure 2:
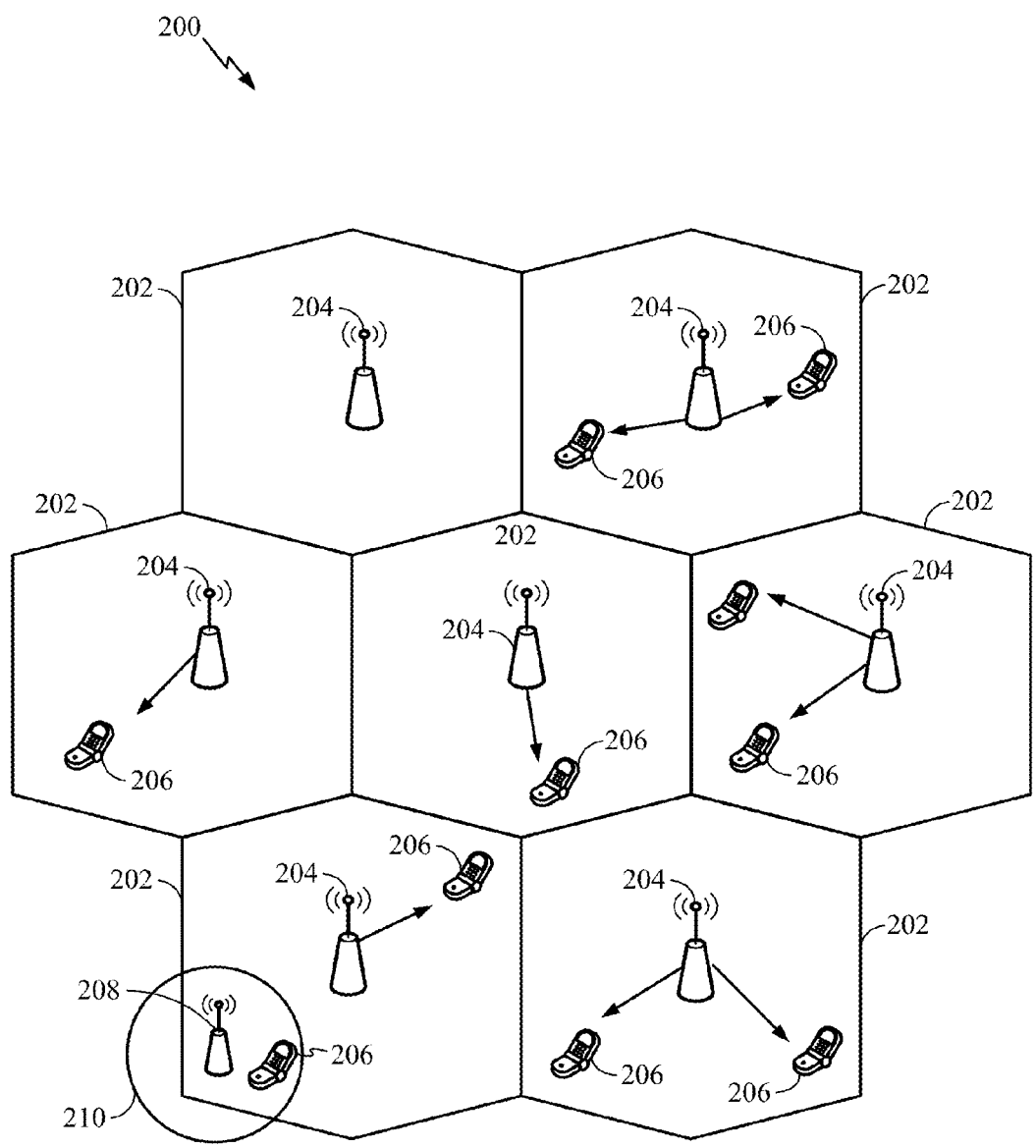
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. The network 200 may also include one or more relays (not shown). According to one application, an UE may serve as a relay.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
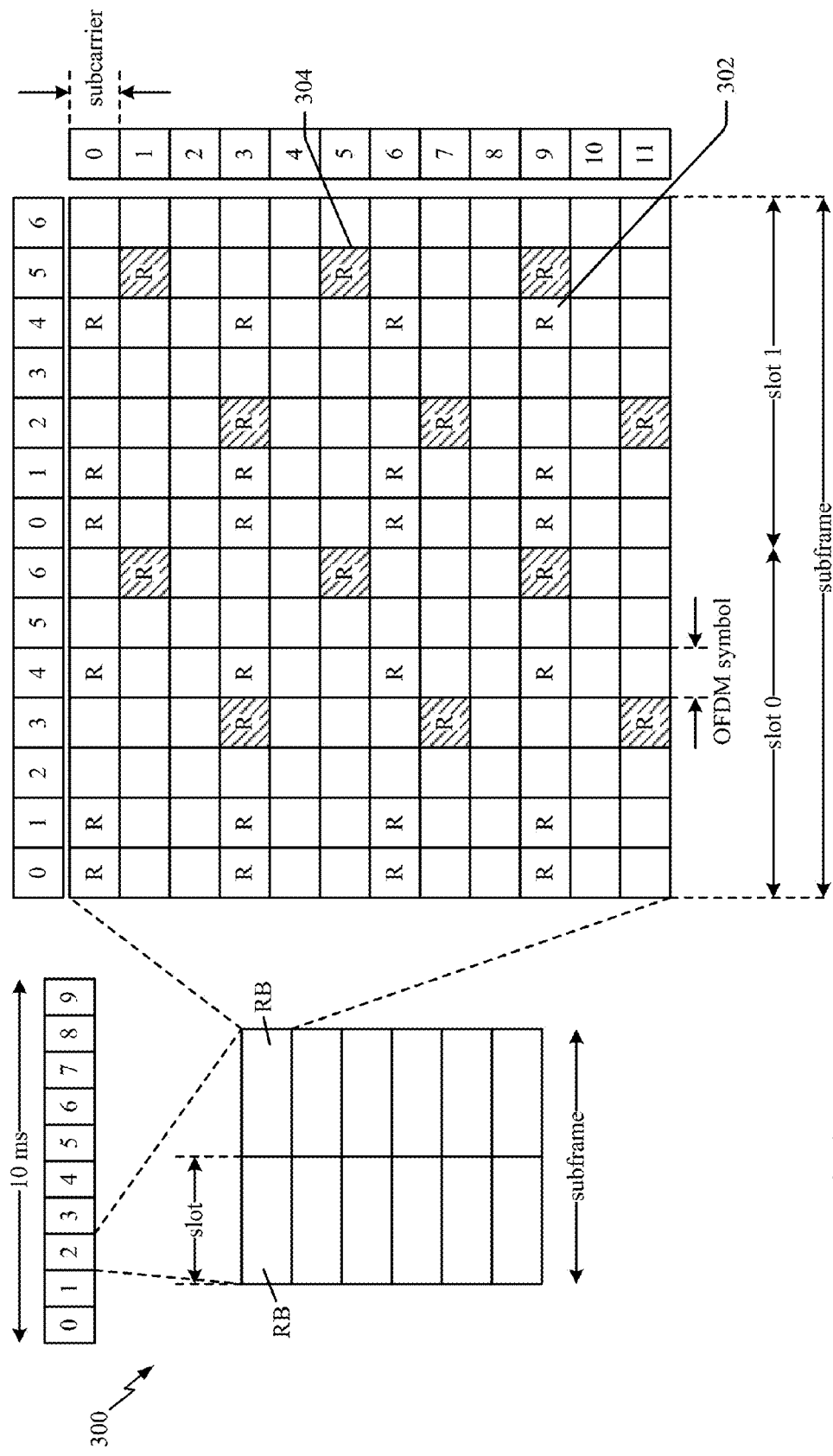
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, R 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH. In aspects of the present methods and apparatus, a subframe may include more than one PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
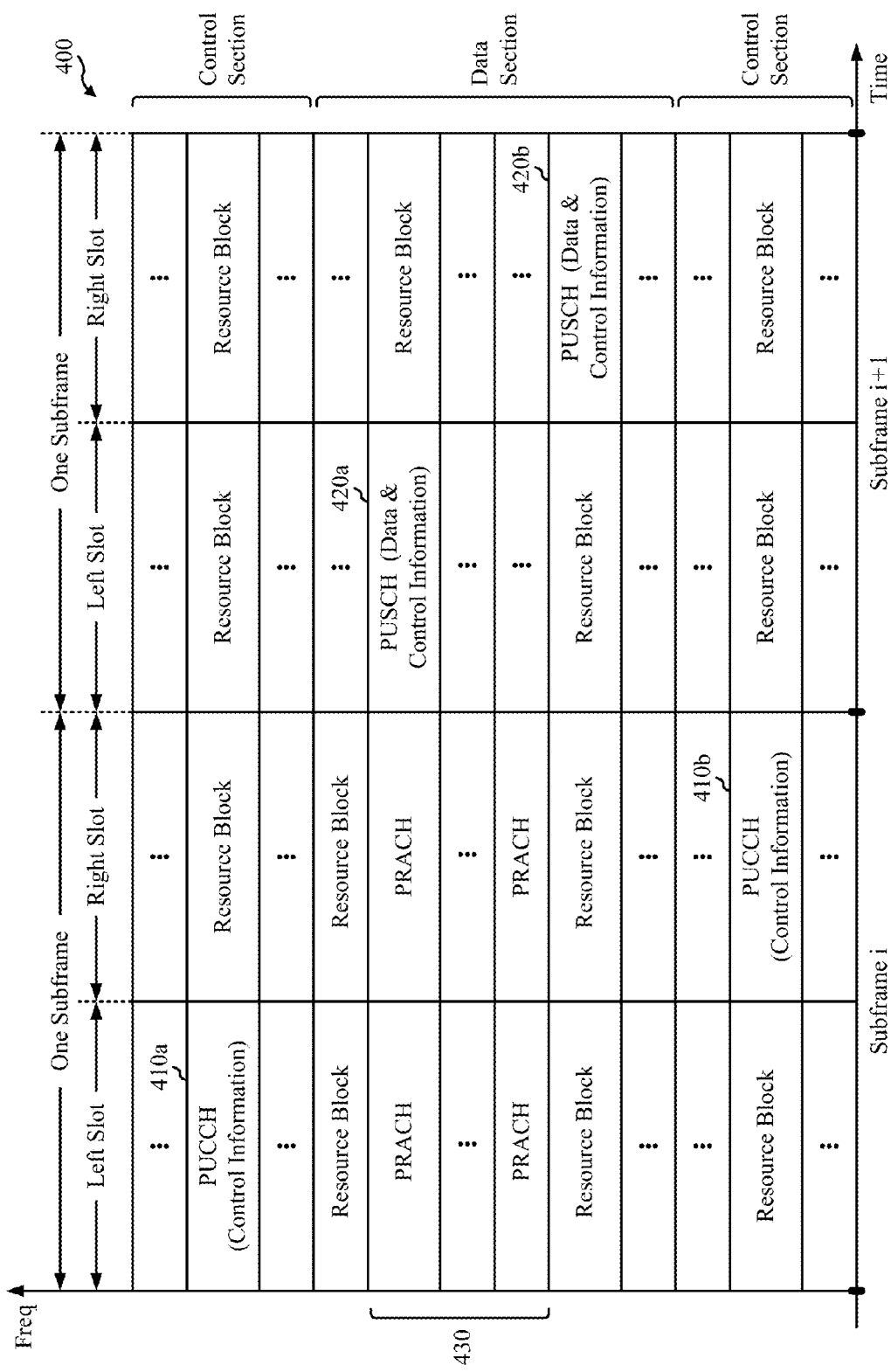
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks 410a, 410b in the control section. The UE may transmit only data or both data and control information in a physical UL shared channel (PUSCH) on the assigned resource blocks 420a, 420b in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
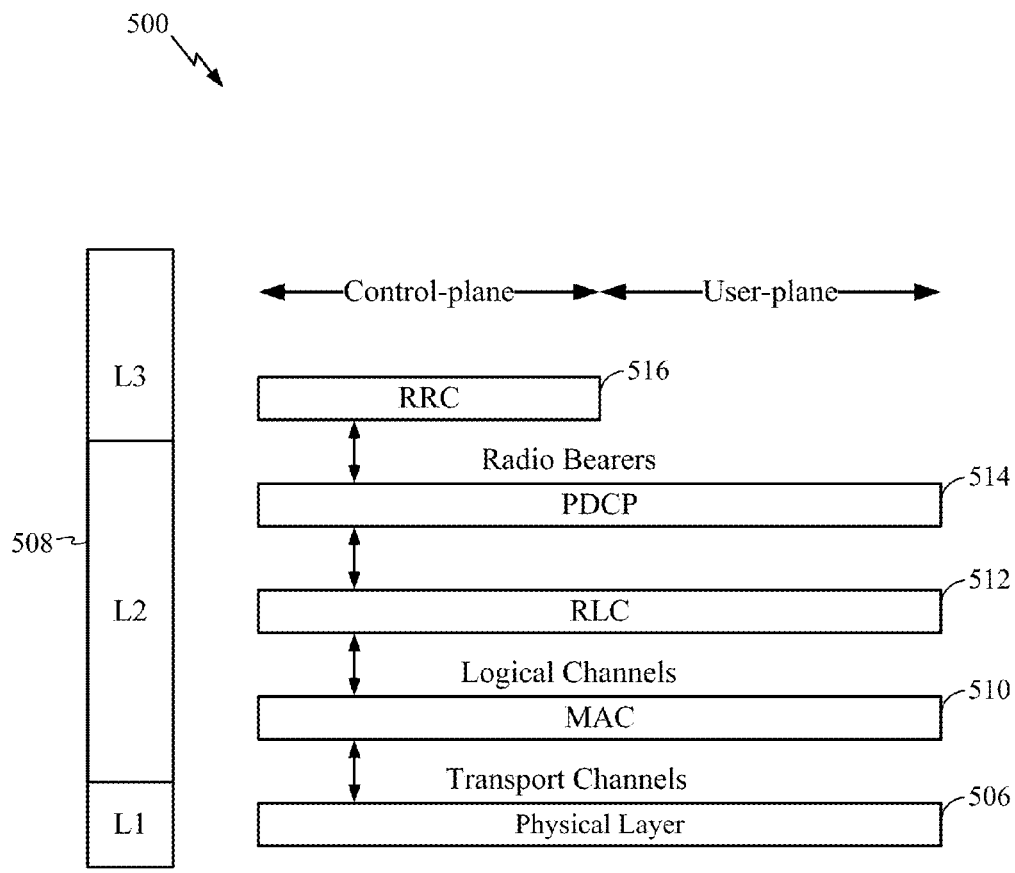
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
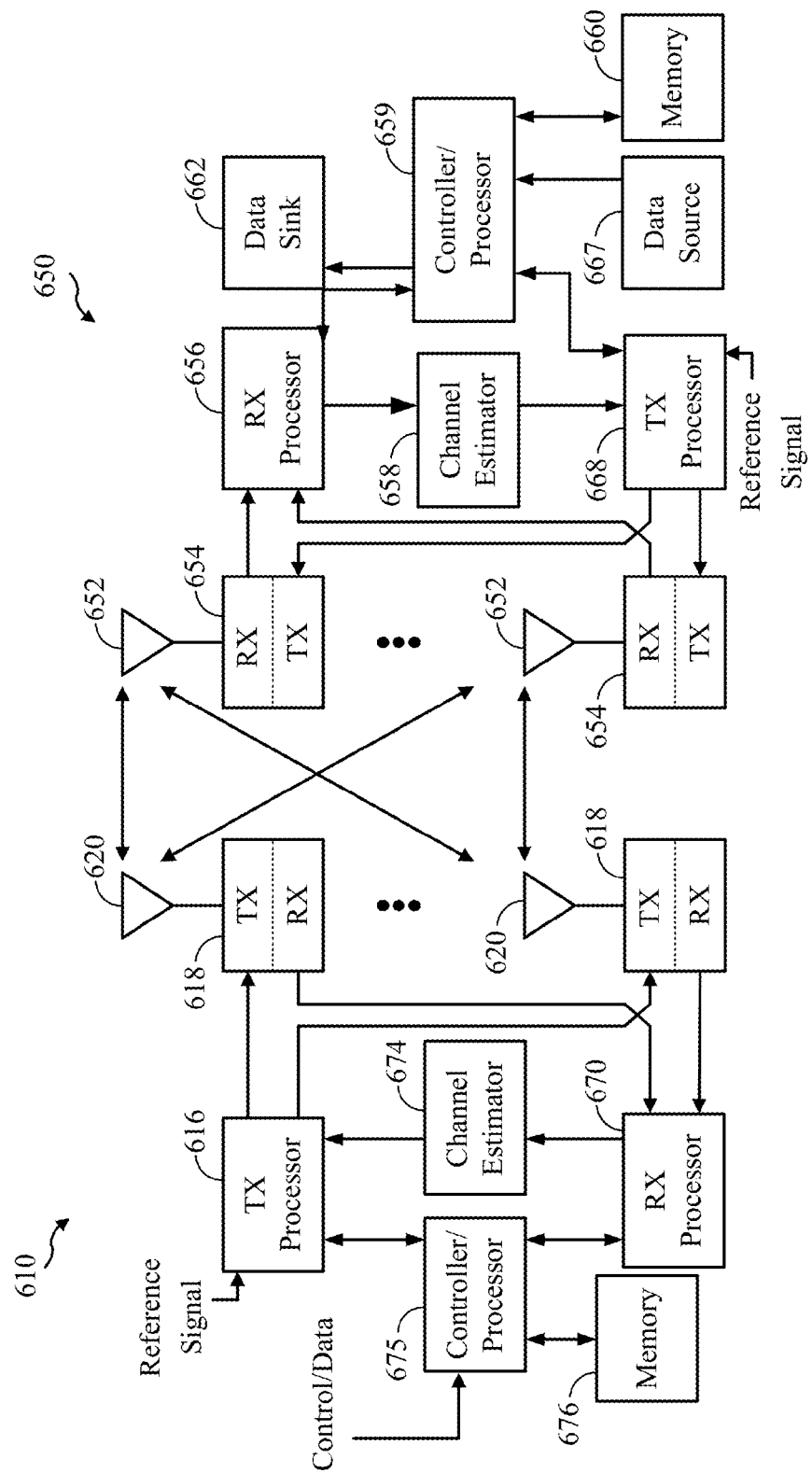
FIG. 6 is a diagram illustrating an example of an evolved Node B and user equipment in an access network, in accordance with certain aspects of the disclosure.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations. The controllers/processors 675, 659 may direct the operation at the eNB 610 and the UE 650, respectively. The controller/processor 659 and/or other processors and modules at the UE 650 may perform or direct operations for example operations 1000 in FIG. 10, and/or other processes for the techniques described herein, for example. The controller/processor 675 and/or other processors and modules at the eNB 610 may perform or direct operations to provide semi-persistent scheduling support for evolved interference management for traffic adaptation (eIMTA) in an LTE network, and/or other processes for the techniques described herein, for example. In aspects, one or more of any of the components shown in FIG. 6 may be employed to perform example operations 1000 and/or other processes for the techniques described herein.

Semi-Persistent Scheduling for eIMTA in LTE

In LTE, different configurations for uplink and downlink subframe directions are supported for both frequency division duplexing (FDD) and time division duplexing (TDD) frame structures.

FIG. 7 shows seven possible downlink (DL) and uplink (UL) subframe configurations supported for TDD. Each DL/UL subframe configuration may have an associated switch-point periodicity, which may be either five or ten milliseconds. Each subframe may either be an uplink, downlink, or special subframe. As evident from the table, for a subframe configuration having a five millisecond switching periodicity, there are two special subframes within one frame. For a subframe configuration having a ten millisecond switching periodicity, there is one special subframe within one frame.

Figure 8:
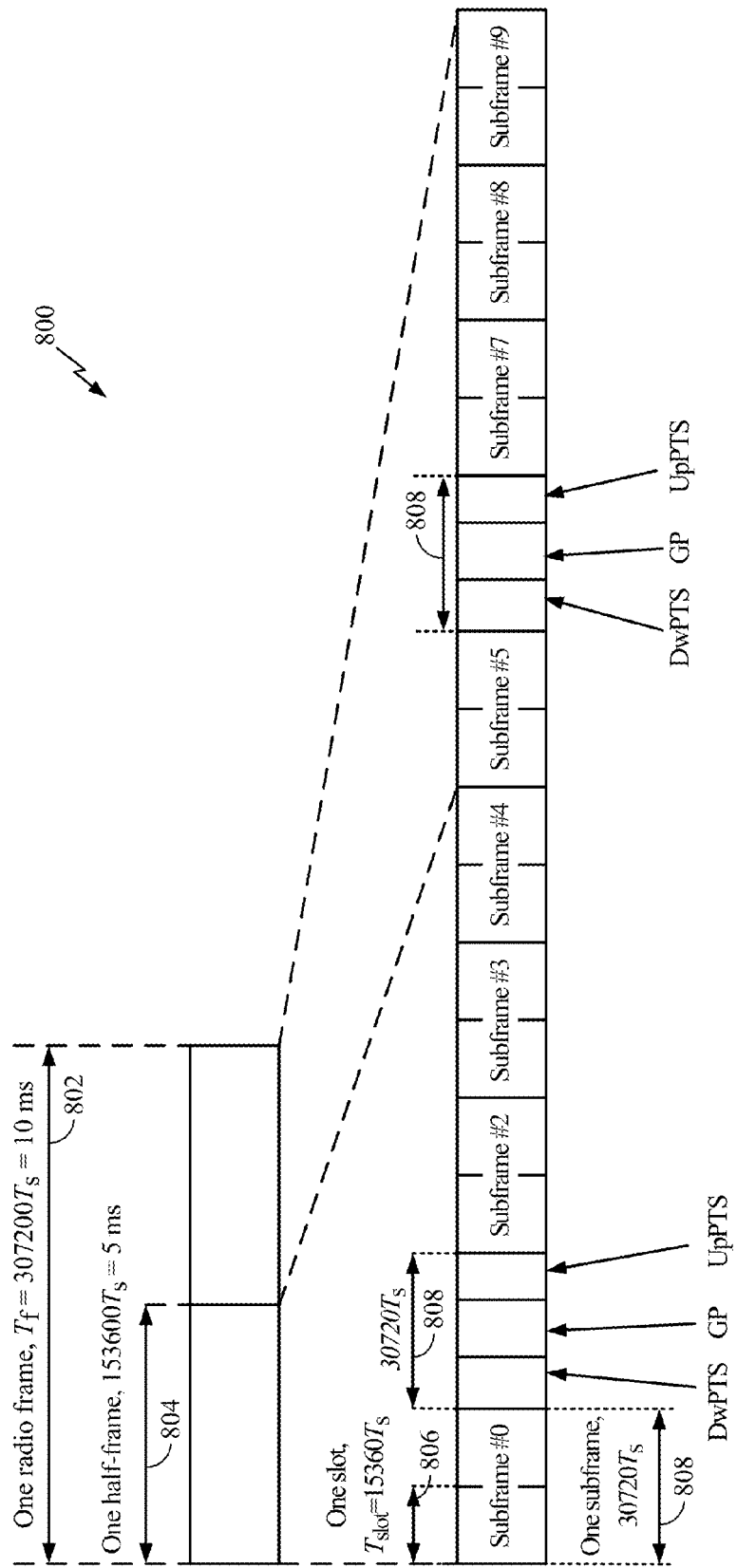
FIG. 8 illustrates an example subframe frame format in accordance with certain aspects of the present disclosure.

FIG. 8 shows an example frame structure 800 for LTE TDD. As shown in FIG. 7, the 10 ms radio frame 802 consists of two half frames 804 of equal length (e.g., 5 ms), with each half frame consisting of 10 slots or 8 slots (e.g. slot 806) plus three special fields DwPTS (downlink pilot time slot, GP (guard period), and UpPTS (uplink pilot time slot) in a special subframe 808. Each slot 806 is 0.5 ms in length and two consecutive slots form exactly one subframe 810.

In some cases, a UE may be configured with different, possibly conflicting, subframe configurations. For example, FIG. 9 is a diagram of frame configurations for an eNB in communication with a UE in an access network, in which the UE may detect a first subframe configuration (e.g., broadcast in SIB1), rely on a second subframe configuration for reference for HARQ operations, and a third subframe configuration to dynamically adjust to changing conditions.

This is possible, for example, in LTE Rel-12, to dynamically adapt TDD DL/UL subframe configurations based on the actual traffic needs, which is also known as evolved interference management for traffic adaptation (eIMTA). For example, according to certain aspects, if during a short duration a large data burst on downlink is needed, the subframe configuration may be changed from, for example, the SIB1 specified configuration #1 in Frame N, which has six DL subframes and four UL subframes, to configuration #2 in Frame N+X, which has eight DL subframes and two UL subframe, one UL subframe in subframe two, the second UL subframe in subframe seven.

Continuing the example, the subframe configuration may then be changed to configuration #4 in Frame N+Y, which also has eight DL subframes and two UL subframes, but the UL subframes are in subframes two and 3. According to certain aspects, the adaptation of a TDD configuration is expected to be no slower than 640 ms. In an extreme case, the adaption may be as fast as 10 ms. Additionally, dynamic indication of a TDD DL/UL subframe configuration may be done by explicit layer 1 signaling of reconfiguration by UE-group-common PDCCH.

Additionally, the adaptation may cause some complexity in DL and UL hybrid automatic repeat request (HARQ) timing management. To simplify HARQ resource management, a reference DL/UL subframe configuration may be used. For example, for UL HARQ, scheduling and HARQ timing may be based on the DL/UL subframe configuration as indicated in system information block 1 (SIB1). For DL HARQ, a UE may be indicated to use one reference configuration, taken from configuration #2, #4, or #5 (as shown in Frames N, N+X and N+Y).

In eIMTA, some subframes may not be subject to dynamic change of transmission directions, while other subframe may be subject to dynamic adaptations. It is generally understood that DL subframes in the TDD DL/UL subframe configuration in SIB1 may not be subject to dynamic adaptation, while UL subframes in the DL HARQ reference configuration may not be subject to dynamic adaptation. For example, in eIMTA, for Frame N+Y, subframes 0, 4, 5, and 9 are DL subframes consistent with SIB1 configuration, while subframe 2 is configured as a UL subframe consistent with the DL HARQ reference configuration.

Semi-persistent scheduling (SPS) may be a control-overhead-efficient way for scheduling DL and/or transmissions. The first transmission of DL (or UL) may be activated by a physical downlink control channel (PDCCH) or an enhanced PDCCH (EPDCCH), and the activated (i.e., configured) transmissions may occur over a set of periodic DL (UL) subframes unless the SPS is released (i.e., deactivated). According to certain aspects, re-transmissions may use the same scheduling method as the dynamic scheduling case.

According to certain aspects, DL SPS and UL SPS may be separately configured. If both DL SPS and UL SPS are configured for a UE, the same SPS Cell Radio Network Temporary Identifier (C-RNTI) may be used for both. The DL SPS periodicity may take the following values: {10, 20, 40, 80, 160, 320, 640} ms and {32, 64, 128} ms. According to certain aspects, a single periodicity value may be configured for a UE After DL SPS activation (i.e., after a SPS DL assignment is configured), a new transport block may be transmitted based on the activated DL SPS parameters (i.e., the configured DL transmission) in each of the following subframes until the DL SPS is deactivated:

$$(10 \times SFN + \text{subframe}) = [(10 \times SFN_{start\ time} + \text{subframe}_{start\ time}) +$$
$$N \times semiPersistSchedIntervalDL]\bmod\ 10240, \text{ for all } N > 0$$

where $SFN_{start\ time}$ and $\text{subframe}_{start\ time}$ are the SFN and subframe, respectively, at the time the configured downlink assignment was initialized (or re-initialized).

According to certain aspects, the number of HARQ processes for DL SPS may take the following values: {1, 2, . . . , 8}. According to certain aspects, the number of HARQ processes for DL SPS may be UE-specifically configured, with HARQ process ID determined by:

$$HARQ\ \text{Process } ID = \left[\text{floor}\left(\frac{CURRENT_{TTI}}{semiPersistSchedIntervalDL}\right)\right]$$
$$\bmod\ numberOfConfSPSProcesses$$

where CURRENT_TTI=[(SFN×10)+subframe number], and
semiPersistSchedIntervalDL is the configured DL SPS periodicity.

FIG. 10A illustrates the number of possibly UL HARQ processes. According to certain aspects, the UL SPS periodicity may take the following values: {10, 20, 40, 80, 160, 320, 640} ms and {32, 64, 128} ms. A single periodicity value may be configured for a UE. Besides explicit release via PDCCH or EPDCCH, UL SPS may also be "implicitly released" based on a timer parameter "implicitReleaseAfter". According to certain aspects, the UE shall clear the configured uplink grant immediately after implicitReleaseAfter (e.g., 2, 3, 4, 8) number of consecutive new MAC PDUs each containing zero MAC SDUs have been provided by the Multiplexing and Assembly entity, on the Semi-Persistent Scheduling resource.

After a Semi-Persistent Scheduling uplink grant is configured, the UE may (e.g., if twoIntervalsConfig is enabled by upper layer) set the Subframe_Offset according to the table illustrated in FIG. 10B. Otherwise the UE may set Subframe_Offset to 0. According to certain aspects, the UE may also consider sequentially that the Nth grant occurs in the subframe for which:

$$(10 \times SFN + \text{subframe}) = [(10 \times SFN_{start\ time} + \text{subframe}_{start\ time}) +$$
$$N \times semiPersistScheduIntervalUL +$$
$$Subframe_{Offset} \times (N \bmod 2)]\bmod 10240$$

where $SFN_{start\ time}$ and $\text{subframe}_{start\ time}$ are the SFN and subframe, respectively, at the time the configured uplink grant was (re-)initialized.

With non-zero Subframe_Offset, the initial SPS UL transmission subframes may not be strictly periodic, but may change in different SPS instances (e.g., parameter N). For example, consider 10 ms SPS under TDD UL/DL configuration #1 in subframe 2, the initial UL SPS transmission subframes for N=1, 2, 3, 4, . . . are (0, 3), (1, 2), (2, 3), (3, 2) . . . , for (SFN index, subframeindex), respectively. According to certain aspects, these subframe offsets help avoid SPS re-transmissions colliding with new SPS transmissions in the same subframe.

Figure 11:
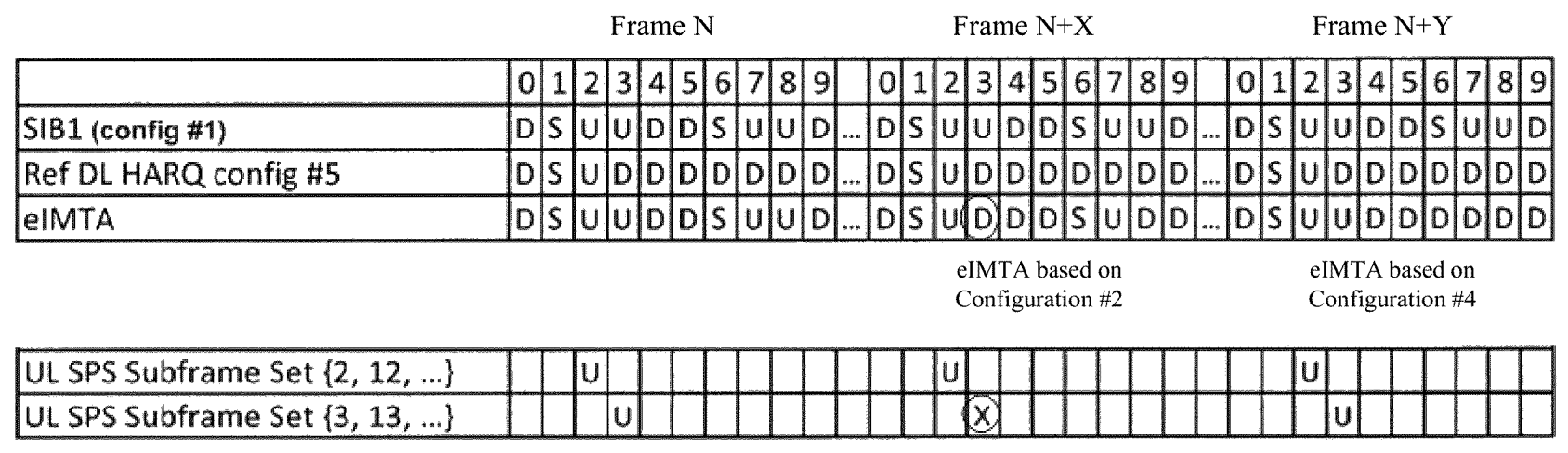

FIG. 11 illustrates how a UE may be configured with different SPS subframe sets that potentially conflict with current subframe configurations, in accordance with aspects of the present disclosure.

As described in conjunction with FIG. 9, eIMTA adaption may be used to adapt TDD DL/UL subframe configurations based on actual traffic needs. In the present example, eIMTA is used to change from the SIB1 specified configuration #1 in Frame N to configuration #2 in Frame N+X in the first eIMTA instance, and configuration #4 in Frame N+Y in the second eIMTA instance. An SPS UL grant may also be configured, for example, in the UL SPS transmission subframes {2, 12, . . . }.

However, given that some UL subframes are subject to dynamic adaptation in terms of subframe directions, there is a need for handling SPS support under eIMTA in LTE. For example, a SPS UL grant may also be configured in the UL SPS transmission subframes {3, 13, . . . }, potentially resulting in a SPS UL transmission scheduled for a subframe subject to dynamic adaption from a UL subframe to a DL subframe, for example in Frame N+X, subframe 3. If subframe grants are received, for example, for UL SPS transmissions scheduled in a dynamic DL subframe, a UE may treat the UL SPS configuration/activation as a mis-configuration/mis-activation.

Figure 12:
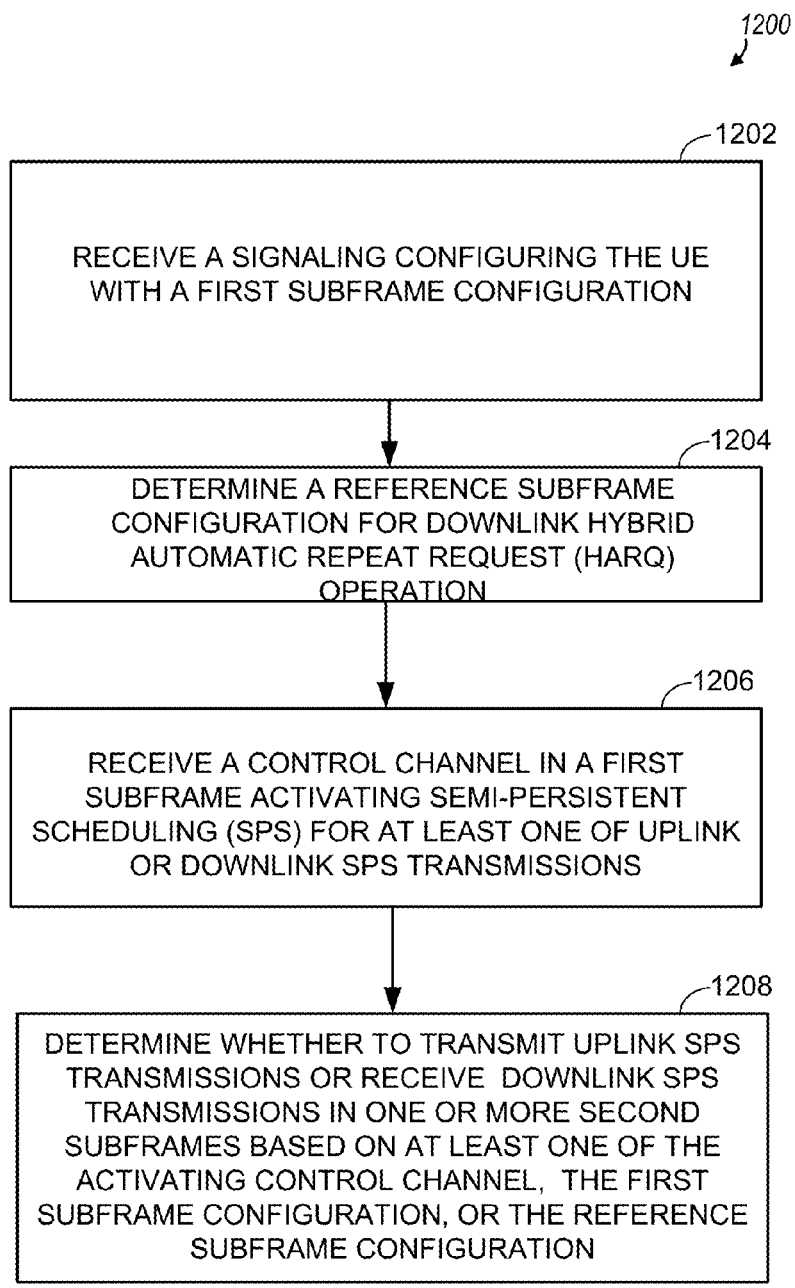
FIG. 12 illustrates example operations for wireless communications by a user equipment (UE), in accordance with certain aspects of the present disclosure.

FIG. 12 illustrates example operations 1200 that may be performed, for example, by a UE capable of supporting SPS in eIMTA in an LTE network.

Operations 1200 begin, at 1202, by receiving signaling configuring the UE with a first subframe configuration. At 1204, the UE determines a reference subframe configuration for downlink hybrid automatic repeat request (HARQ) operation. At 1206, the UE receives a control channel in a first subframe activating semi-persistent scheduling (SPS) for at least one of uplink or downlink SPS transmissions. At 1208, the UE determines whether to transmit uplink SPS transmissions or receive downlink SPS transmissions in one or more second subframes based on at least one of the activating control channel, the first subframe configuration, or the reference subframe configuration.

According to certain aspects of the present disclosure, SPS may be supported in eIMTA in various ways. As one example, SPS may be supported in eIMTA by handling for DL SPS and UL SPS differently. According to certain aspects, under this approach, for DL SPS, SPS activating control channel and/or physical downlink shared channel (PDSCH) subframes may be based on a system information block 1 (SIB1) indicating TDD DL/UL subframe configuration, while DL HARQ timing may be based on DL HARQ reference configuration.

According to certain aspects, for UL SPS, SPS activation control channel and/or physical uplink shared channel (PUSCH) subframes may be based on a DL HARQ reference configuration, while UL scheduling/HARQ timing may be based on a SIB indicated TDD DL/UL subframe configuration. According to further aspects, implicit UL SPS release is also based on a DL HARQ reference configuration. In other words, according to certain aspects, DL SPS configuration and transmissions may be based on "fixed" DL subframes (as per SIB1 TDD configuration), while UL SPS configuration and transmissions may be based on "fixed" UL subframes (such as per a DL HARQ reference configuration).

According to certain aspects, another way to support SPS in eIMTA may be to handle DL SPS and UL SPS in the same manner. According to further aspects, for both DL SPS and UL SPS, SPS activation control channel and/or PDSCH/ PUSCH subframes may be based on SIB1 indicated TDD DL/UL subframe configuration, while the DL HARQ timing may be based on a DL HARQ reference configuration and the UL scheduling/HARQ timing may be based on a SIB indicated TDD DL/UL subframe configuration.

According to further aspects, implicit UL SPS release may also be based on a SIB1 indicated TDD DL/UL subframe configuration. In other words, according to certain aspects, while DL SPS configuration and transmissions may be based on "fixed" DL subframes (as per SIB1 TDD configuration), UL SPS configuration and transmissions may be based on "fixed and dynamic" UL subframes (as per SIB1 TDD configuration). As another example, for both DL SPS and UL SPS, SPS activation control channel and/or PDSCH/PUSCH subframes may be based on a dynamically indicated TDD DL/UL subframe configuration, subject to a fallback operation (i.e., the UE does not receive the dynamic configuration due to miss detection or DRX operation) where under fallback, a SIB indicated subframe configuration may be used.

However, according to certain aspects, there may be potential issues with dynamic UL subframes. According to certain aspects, one solution to address the issues with dynamic UL subframes may be to always omit new SPS transmissions in dynamic UL subframes.

Another possible solution to address the issues with dynamic UL subframes may be to omit new SPS transmissions in those dynamic UL subframes which are determined as either DL or special subframes based on the dynamic TDD DL/UL subframe configuration. According to further aspects, in case of discontinuous reception (DRX) or fallback (i.e., when the UE does not receive or monitor the dynamic TDD subframe configuration indication), the UE may omit new SPS transmissions in those dynamic UL subframes.

Another possible solution to address the issues with dynamic UL subframes may be for the UE to treat a UL SPS configuration/activation as a mis-configuration/mis-activation if at least one new SPS transmission will belong to a dynamic UL subframe.

According to further aspects, another way to support SPS in eIMTA may be to allow new SPS subframes to overwrite a subframe direction indicated by the dynamic TDD DL/UL subframe configuration. That is, PDSCH/PUSCH subframes may still be based on SIB1 (or DL HARQ reference configuration) indicated TDD DL/UL subframe configuration, but the UE may always treat a subframe as a DL (or UL) subframe if the subframe is determined to be a DL new SPS subframe (or an UL new SPS subframe).

Certain aspects of the present disclosure provide for UL power control sets for a system supporting eIMTA and SPS. For UL in eIMTA, two UL power control subframe sets are agreed for PUSCH (dynamic traffic). However, for UL SPS, if two UL power control subframe sets are configured for the UE, there may be an issue of whether the two subframe sets should be applicable to SPS traffic as well.

According to certain aspects, one possible way to address this SPS UL power control issue may be to main open loop power control parameters for SPS as only one subframe set and let the closed loop power control follow the two subframe set as in dynamic traffic. Additionally or alternatively, both the open power control and the closed power control for SPS may follow two subframe sets. Additionally or alternatively, both the open power control and the closed power control for SPS may only follow one subframe set.

Certain aspects of the present disclosure provide for subframe configuration 6 (as depicted in FIG. 7) handling in a system supporting eIMTA and SPS. According to certain aspects, due to two TDD switching periodicities (5 ms and 10 ms), subframe 6 may be subject to dynamic change between DL subframes and special subframes. For example, subframe 6 may be subject to dynamic change between DL subframes and special subframes when SIB1 indicates a special subframe but dynamic indication indicates a regular DL subframe. Additionally, subframe 6 may be subject to dynamic change between DL subframes and special subframes when SIB1 indicates a regular DL subframe but dynamic indication indicates a special subframe. In both of these instances there may be an issue whether DL SPS (new transmissions) should follow SIB1 or the dynamic indication indicated subframe type.

According to certain aspects, it may be desirable for DL SPS (new transmissions) to follow SIB1. Additionally or alternatively, it may be desirable for DL SPS (new transmissions) to follow the dynamic indication when available and to follow SIB1 when the dynamic indication is not available.

If new SPS transmissions are subject to subframe type changes (e.g., between special subframes and regular downlink subframes), there may be a need to adjust some of the SPS parameters for new transmissions automatically, because of the amount of available resources per resource block is different between special subframes and regular downlink subframes. According to certain aspects, adjustment may include the number of resource blocks (RBs), the location of RBs, modulation coding scheme (MCS), etc.

According to certain aspects, another issue may be how to handle UL TTI bundling under eIMTA. TTI bundling may be enabled on a per-UE basis and, once enabled, a single transport block may be transmitted in four consecutive UL subframes. However, it is not clear which four UL subframes should be chosen for transmitting transport blocks.

According to certain aspects, one solution to determine which four UL subframes should be used to transmit transport blocks may be to base the decision on SIB1. However, some UL subframes may not be available due to dynamic direction change. Thus, it may be desirable to omit UL transmissions in all flexible UL subframes. Additionally or alternatively, it may be desirable to omit UL transmissions in flexible UL subframes when these subframes are determined to be DL or special subframe (based on the dynamic indication). Under fallback/DRX, the UE may always omit flexible UL subframes. Additionally or alternatively, it may be desirable to always transmit regardless of dynamic indication. In other words, the UE may always assume the UL subframes are available.

According to certain aspects, another solution to determine which four UL subframes should be used to transmit transport blocks may be to base the decision on DL HARQ reference configuration (i.e., not supporting TTI bundling under eIMTA). This implies that TTI bundling may not be supported under eIMTA.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. A phrase referring to "at least one of" a list of items refers to any combination of those items, including single members. As an example, "at least one of: a, b, or c" is intended to cover: a, b, c, a-b, a-c, b-c, and a-b-c.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for wireless communications by a user equipment (UE), comprising:
    receiving signaling configuring the UE with a first subframe configuration;
    determining a reference subframe configuration for downlink hybrid automatic repeat request (HARQ) operation;
    receiving an activating control channel in a first subframe activating a semi-persistent scheduling (SPS) configuration for at least one of uplink or downlink SPS transmissions;
    detecting, in one or more second subframes, a conflict between the first subframe configuration and the SPS configuration for the at least one of uplink or downlink SPS transmissions; and
    after detecting the conflict, determining whether to transmit uplink SPS transmissions or receive downlink SPS transmissions in the one or more second subframes based on at least one of the first subframe configuration or the reference subframe configuration.

2. The method of claim 1, wherein the signaling configuring the UE with the first subframe configuration is based on a system information block.

3. The method of claim 1, wherein the reference subframe configuration is based on a radio resource control (RRC) configuration.

4. The method of claim 1, further comprising at least one of:
    transmitting the uplink SPS transmissions based at least in part on the determination of whether to transmit uplink SPS transmissions in the one or more second subframes; or
    receiving the downlink SPS transmissions based at least in part on the determination of whether to receive downlink SPS transmissions in the one or more second subframes.

5. The method of claim 4, further comprising:
    receiving a configuration configuring a set of SPS parameters for the UE, wherein the set of SPS parameters include at least one of a SPS interval, a UE-specific identity, a number of HARQ processes, a set of HARQ resources, a set of power control parameters, a timer for implicit release, or a parameter controlling a two-interval operation, wherein the determination of whether to transmit uplink SPS transmissions or receive downlink SPS transmissions in the one or more second subframes is further based on the configuration of the set of SPS parameters.

6. The method of claim 5, further comprising determining to transmit the uplink SPS transmissions or receive the downlink SPS transmissions in a subframe of the one or more second subframes based on the activating control channel, the configuration of the set of SPS parameters, and the first subframe configuration, independent of the reference subframe configuration.

7. The method of claim 1, wherein the activating control channel assigns at least one of a set of resources or a modulation and coding indicator for the at least one of uplink SPS transmission or downlink SPS transmission.

8. The method of claim 1, further comprising receiving a dynamic indicator indicating a second subframe configuration different from the first subframe configuration.

9. The method of claim 8, wherein the SPS configuration is a downlink SPS configuration, and the determination whether to receive the downlink SPS transmissions in the one or more second subframes is based on both the first subframe configuration and the second subframe configuration.

10. The method of claim 9, further comprising determining to receive the downlink SPS transmissions in a subframe of the one or more second subframes when the subframe is indicated by both the first subframe configuration and the second subframe configuration as a downlink subframe or a special subframe.

11. The method of claim 9, further comprising determining to omit receiving the downlink SPS transmissions in a subframe of the one or more second subframes when the subframe is indicated by one of the first subframe configuration or the second subframe configuration as a downlink subframe but indicated by another configuration as at least one of an uplink subframe or a special subframe.

12. The method of claim 1, further comprising determining to receive the downlink SPS transmissions in a subframe of the one or more second subframes when the subframe is indicated by the first subframe configuration as one of a downlink subframe or a special subframe.

13. The method of claim 1, wherein the SPS configuration is an uplink SPS configuration, and the determination whether to transmit the uplink SPS transmissions in the one or more second subframes is based on at least both the reference subframe configuration and the first subframe configuration.

14. The method of claim 13, wherein the determination whether to transmit the uplink SPS transmissions in the one or more second subframes is further based on a second subframe configuration dynamically indicated.

15. The method of claim 1, further comprising determining a power control set from a plurality of power control sets for at least one subframe of the one or more second subframes, and transmitting an uplink SPS transmission in the at least one subframe of the one or more second subframes based on the determined power control set.

16. An apparatus for wireless communications, comprising:
means for receiving signaling configuring the apparatus with a first subframe configuration;
means for determining a reference subframe configuration for downlink hybrid automatic repeat request (HARQ) operation;
means for receiving an activating control channel in a first subframe activating a semi-persistent scheduling (SPS) configuration for at least one of uplink or downlink SPS transmissions;
means for detecting, in one or more second subframes, a conflict between the first subframe configuration and the SPS configuration for the at least one of uplink or downlink SPS transmissions; and
means for determining, after detecting the conflict, whether to transmit uplink SPS transmissions or receive downlink SPS transmissions in the one or more second subframes based on at least one of the first subframe configuration or the reference subframe configuration.

17. The apparatus of claim 16, wherein the signaling configuring the apparatus with the first subframe configuration is based on a system information block.

18. The apparatus of claim 16, wherein the reference subframe configuration is based on a radio resource control (RRC) configuration.

19. The apparatus of claim 16, further comprising:
means for transmitting the uplink SPS transmissions based at least in part on the determination of whether to transmit uplink SPS transmissions in the one or more second subframes; or
means for receiving the downlink SPS transmissions based at least in part on the determination of whether to receive downlink SPS transmissions in the one or more second subframes.

20. The apparatus of claim 19, further comprising:
means for receiving a configuration configuring a set of SPS parameters for the UE, wherein the set of SPS parameters include at least one of a SPS interval, a UE-specific identity, a number of HARQ processes, a set of HARQ resources, a set of power control parameters, a timer for implicit release, or a parameter controlling a two-interval operation, wherein the means for determining whether to transmit uplink SPS transmissions or receive downlink SPS transmissions in the one or more second subframes is further based on the configuration of the set of SPS parameters.

21. The apparatus of claim 16, wherein the activating control channel assigns at least one of a set of resources or a modulation and coding indicator for the at least one of uplink SPS transmission or downlink SPS transmission.

22. The apparatus of claim 16, further comprising means for receiving a dynamic indicator indicating a second subframe configuration different from the first subframe configuration.

23. The apparatus of claim 22, wherein the SPS configuration is a downlink SPS configuration, and the means for determining whether to receive the downlink SPS transmissions in the one or more second subframes is based on both the first subframe configuration and the second subframe configuration.

24. The apparatus of claim 23, further comprising means for determining to receive the downlink SPS transmissions in a subframe of the one or more second subframes when the subframe is indicated by both the first subframe configuration and the second subframe configuration as a downlink subframe or a special subframe.

25. The apparatus of claim 23, further comprising means for determining to omit receiving the downlink SPS transmissions in a subframe of the one or more second subframes when the subframe is indicated by one of the first subframe configuration or the second subframe configuration as a downlink subframe but indicated by another configuration as at least one of an uplink subframe or a special subframe.

26. The apparatus of claim 16, further comprising means for determining to receive the downlink SPS transmissions in a subframe of the one or more second subframes when the subframe is indicated by the first subframe configuration as one of a downlink subframe or a special subframe.

27. An apparatus for wireless communications, comprising at least one processor and a memory coupled to the at least one processor, wherein:
the at least one processor is configured to:
receive signaling configuring the apparatus with a first subframe configuration;
determine a reference subframe configuration for downlink hybrid automatic repeat request (HARQ) operation;
receive an activating control channel in a first subframe activating a semi-persistent scheduling (SPS) configuration for at least one of uplink or downlink SPS transmissions;
detect, in one or more second subframes, a conflict between the first subframe configuration and the SPS configuration for the at least one of uplink or downlink SPS transmissions; and
after detecting the conflict, determine whether to transmit uplink SPS transmissions or receive downlink SPS transmissions in the one or more second subframes based on at least one of the first subframe configuration or the reference subframe configuration.

28. A computer-readable medium for wireless communications by a user equipment (UE), having instructions stored thereon, the instructions executable by one or more processors for:
receiving signaling configuring the UE with a first subframe configuration;
determining a reference subframe configuration for downlink hybrid automatic repeat request (HARQ) operation;
receiving an activating control channel in a first subframe activating a semi-persistent scheduling (SPS) configuration for at least one of uplink or downlink SPS transmissions;
detecting, in one or more second subframes, a conflict between the first subframe configuration and the SPS configuration for the at least one of uplink or downlink SPS transmissions; and
after detecting the conflict, determining whether to transmit uplink SPS transmissions or receive downlink SPS transmissions in the one or more second subframes based on at least one of the first subframe configuration or the reference subframe configuration.

* * * * *